United States Patent
Yokoyama

(10) Patent No.: US 9,317,231 B2
(45) Date of Patent: Apr. 19, 2016

(54) IMAGE FORMING APPARATUS, INFORMATION PROCESSING APPARATUS, CONTROL METHOD THEREOF, AND STORAGE MEDIUM

(75) Inventor: Hidehiko Yokoyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/478,489

(22) Filed: May 23, 2012

(65) Prior Publication Data

US 2012/0314251 A1 Dec. 13, 2012

(30) Foreign Application Priority Data

Jun. 9, 2011 (JP) .................................. 2011-129533

(51) Int. Cl.
| | |
|---|---|
| *G06F 3/12* | (2006.01) |
| *G06F 21/10* | (2013.01) |
| *H04N 1/00* | (2006.01) |
| *G06F 21/60* | (2013.01) |

(52) U.S. Cl.
CPC ............ *G06F 3/1222* (2013.01); *G06F 3/1238* (2013.01); *G06F 3/1247* (2013.01); *G06F 3/1288* (2013.01); *G06F 21/608* (2013.01); *H04N 1/00244* (2013.01); *H04N 2201/0015* (2013.01); *H04N 2201/0039* (2013.01); *H04N 2201/0094* (2013.01)

(58) Field of Classification Search
CPC .................................... G06F 3/12; H04N 1/00
USPC ......................................................... 358/1.15
See application file for complete search history.

(56) References Cited

U.S. PATENT DOCUMENTS

| | | | | | |
|---|---|---|---|---|---|
| 6,094,276 | A | * | 7/2000 | Yamaguchi et al. | ......... 358/1.15 |
| 7,092,119 | B1 | * | 8/2006 | Hinds et al. | .................... 358/1.9 |
| 7,877,427 | B2 | * | 1/2011 | Nakagawa | ............ G06F 3/1222 |
| | | | | | 358/1.13 |
| 8,744,365 | B2 | * | 6/2014 | Kim et al. | ..................... 455/66.1 |
| 8,749,821 | B2 | * | 6/2014 | Godavari | .............. G06F 3/1222 |
| | | | | | 358/1.14 |
| 9,094,637 | B2 | * | 7/2015 | Ito | ...................... H04N 1/00127 |
| | | | | | 358/1.13 |
| 2003/0002072 | A1 | * | 1/2003 | Berkema et al. | .............. 358/1.15 |
| 2003/0099353 | A1 | * | 5/2003 | Goh et al. | ........................ 380/51 |
| 2004/0009769 | A1 | * | 1/2004 | Yokoyama | ..................... 455/423 |
| 2004/0174560 | A1 | * | 9/2004 | Shima | .......................... 358/1.15 |
| 2005/0213152 | A1 | * | 9/2005 | Suzuki et al. | ................. 358/1.15 |

(Continued)

FOREIGN PATENT DOCUMENTS

| | | |
|---|---|---|
| JP | 2004-46601 A | 2/2004 |
| JP | 2004-265409 A | 9/2004 |
| JP | 2007-257529 A | 10/2007 |

*Primary Examiner* — Marivelisse Santiago Cordero
*Assistant Examiner* — Daryl Jackson
(74) *Attorney, Agent, or Firm* — Canon USA, Inc. IP Division

(57) ABSTRACT

An image forming apparatus to access a file server and a job server connected to an internet via a local area network, and issue a print request of a file managed by the file server, includes a file server connection unit, a job server connection unit, a token acquisition unit, a print request unit, and a print unit. The file server connection unit connects with the file server. The job server connection unit connects with the job server. The token acquisition unit acquires a token associated with connection with the image forming apparatus from the job server connected by the job server connection unit. The print request unit issues the print request for the file server connected by the file server connection unit using the token acquired by the token acquisition unit. The print unit prints print data received from the job server connected by the job server connection unit.

4 Claims, 7 Drawing Sheets

(56) References Cited

U.S. PATENT DOCUMENTS

| | | | |
|---|---|---|---|
| 2006/0200850 A1* | 9/2006 | Yoshizawa | 725/110 |
| 2006/0222352 A1* | 10/2006 | Kawase et al. | 396/15 |
| 2007/0195357 A1* | 8/2007 | Matsuba | 358/1.15 |
| 2008/0084578 A1* | 4/2008 | Walker et al. | 358/1.15 |
| 2008/0270516 A1* | 10/2008 | Ragnet et al. | 709/202 |
| 2009/0235341 A1* | 9/2009 | Hashimoto | 726/5 |
| 2010/0161764 A1* | 6/2010 | Ono et al. | 709/219 |
| 2011/0069352 A1* | 3/2011 | Yaguchi | G06F 3/1211 358/1.16 |
| 2012/0019858 A1* | 1/2012 | Sato | 358/1.15 |
| 2012/0274982 A1* | 11/2012 | Yabe | 358/1.15 |
| 2013/0066976 A1* | 3/2013 | Massey et al. | 709/206 |

\* cited by examiner

FIG.2

| IMAGE FORMING APPARATUS IDENTIFIER | CORRESPONDING FORMAT | CONNECTION PORT | TOKEN | WAITING JOB |
|---|---|---|---|---|
| A0001123456 | LIPS | 21001 | 916e11f395051 bdabd341bb679 a3067e89e3afa1 | JOB000023 |
| B000987654 | PDF | | | |

201  202  203  204  205

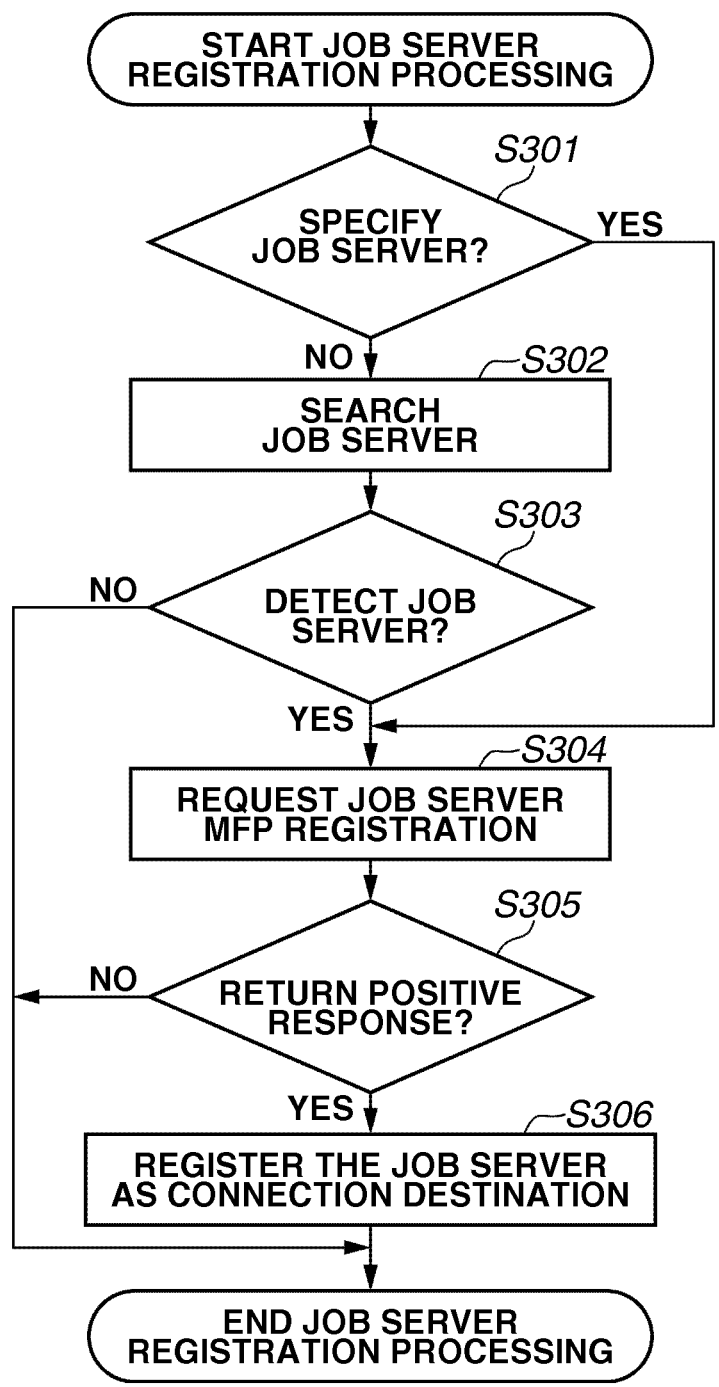

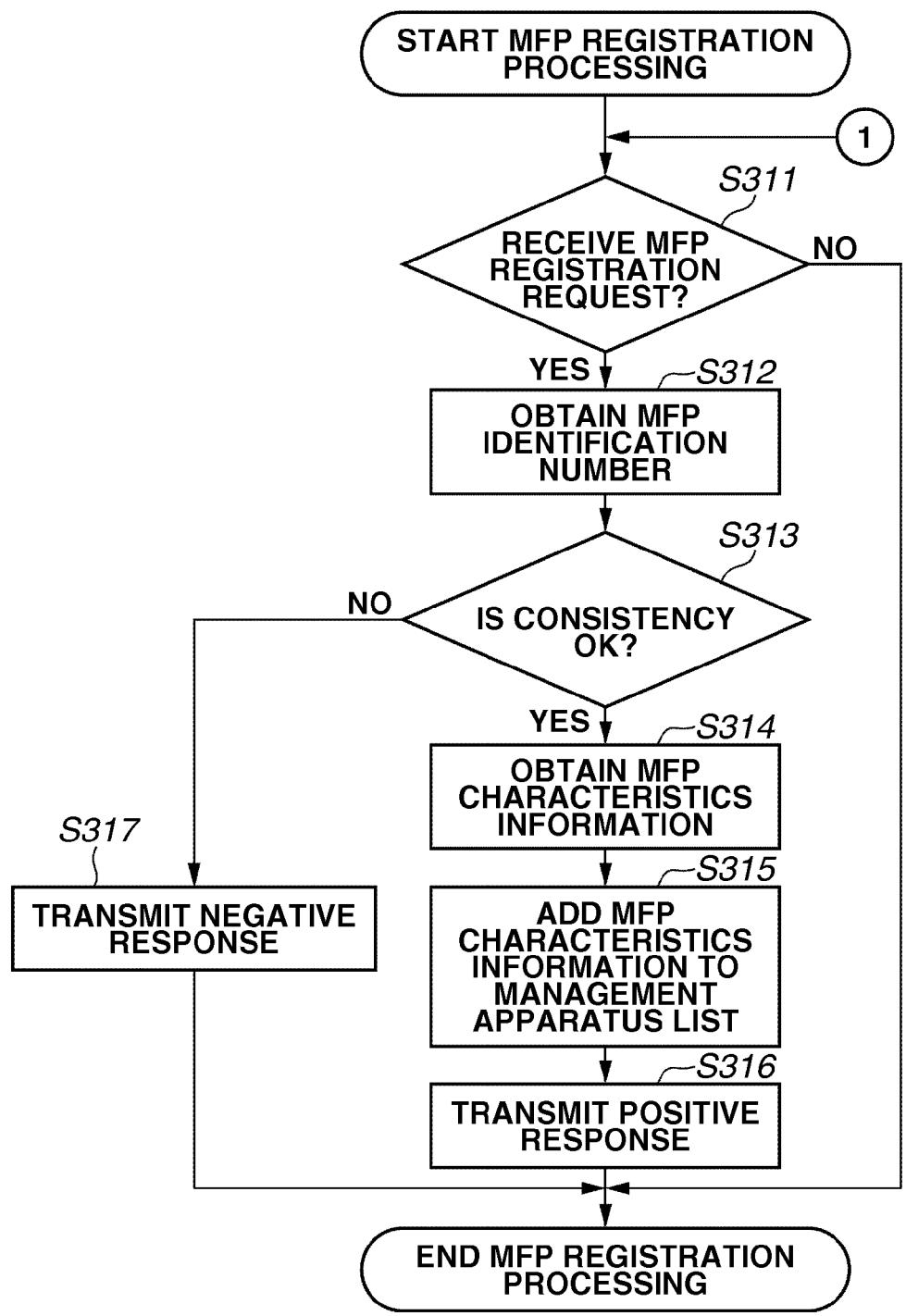

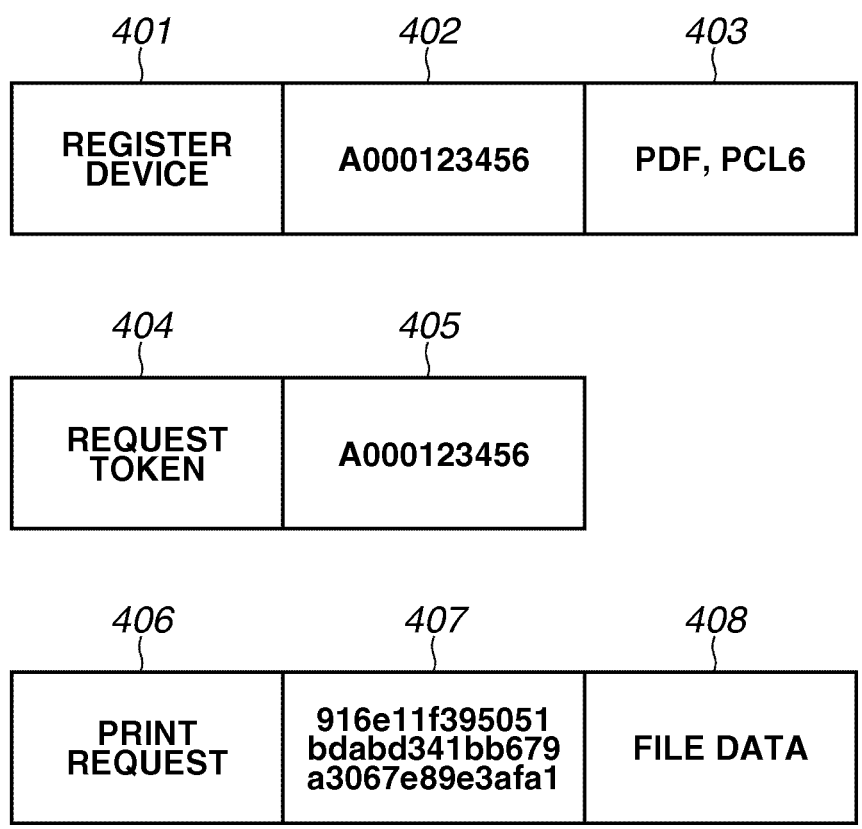

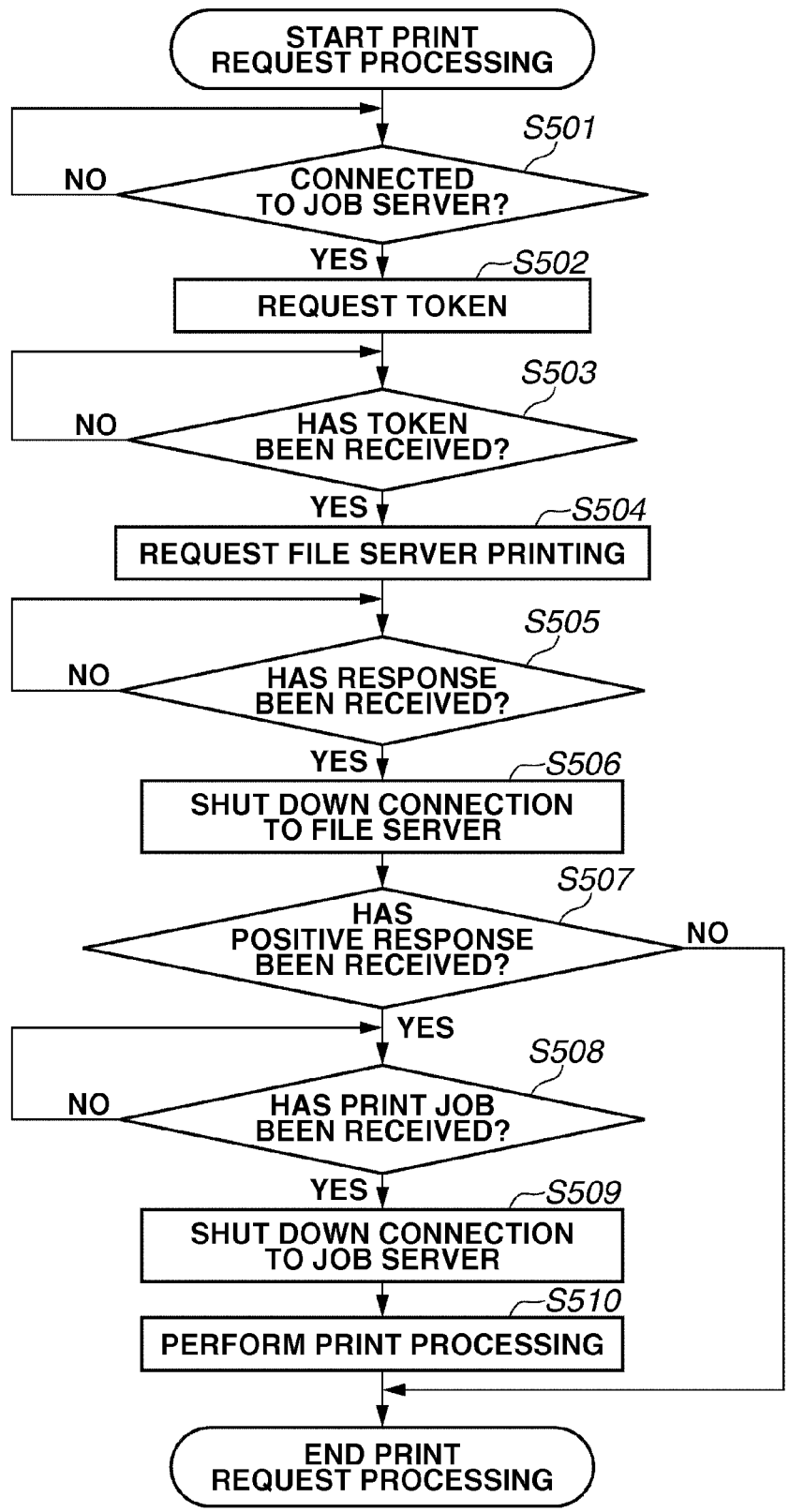

IMAGE FORMING APPARATUS, INFORMATION PROCESSING APPARATUS, CONTROL METHOD THEREOF, AND STORAGE MEDIUM

BACKGROUND OF THE INVENTION

1. Field of the Invention

The present invention relates to an information processing apparatus capable of being accessed via a network, and an image forming apparatus printing and outputting a file stored in the information processing apparatus.

2. Description of the Related Art

In recent years, as a main stream, many image forming apparatus has been operated as a multifunctional apparatus having a plurality of functions for, for example, storing image data and transmitting and receiving the image data via a communication line such as a public line and a local area network (LAN), in addition to a copy function for printing and outputting image data read from an original. With the multiple functions, the image forming apparatus accesses from its operation unit a file stored in the information processing apparatus capable of being accessed via an internet to perform printing and outputting from the image forming apparatus.

However, when the image forming apparatus outputs the file stored in the information processing apparatus cable of being accessed via the internet, the image forming apparatus can scarcely acquire the file in a format that can appropriately perform printing and outputting. Generally, the file is provided in a format that can be operated only by a specific application program operated in the information processing apparatus. Thus, it is assumed that, based on a print instruction from the specific application program, image data is converted into a format that can be processed by the image forming apparatus, which is to be a printing and outputting target, using a program referred to as a printer driver, and then transmitted to the image forming apparatus to be printed.

On the other hand, devices including mobile phones and information terminals have been practically used that have a lower performance of a central processing unit (CPU) and a less memory loadage than those of the information processing apparatus represented by conventional personal computers. A system has been realized in which such devices operate the file stored in the information processing apparatus capable of being accessed via the internet to instruct printing and outputting.

In this case, it is not realistic for the mobile phone and the information terminal to convert the file into a format that can perform printing using the printer driver, considering performance of hardware thereof. Thus, the information processing apparatus is requested to convert the file into a format (print data) that can be processed by the image forming apparatus specified as the printing and outputting target, and transmit the converted file to the image forming apparatus to allow the image forming apparatus to perform printing and outputting.

Further, a local area network (LAN) and the internet are connected to each other via the information processing apparatus referred to as a firewall, and connection from the LAN to the internet is allowed. On the other hand, by performing control for, for example, refusing the connection from the internet to the LAN, an unauthorized access from the internet to the LAN is generally prevented.

It is also conceivable that, after a print request is issued by the image forming apparatus to the information processing apparatus connected to the internet, the file is similarly forwarded to another information processing apparatus connected to the internet, and then converted into the format that can be processed by the another image forming apparatus. However, completion of the conversion processing cannot be recognized by the image forming apparatus, which is a print request source, and access from the information processing apparatus storing the converted data to the image forming apparatus is also refused by the above-described firewall. As a method for solving such a problem, Japanese Patent Application Laid-Open No. 2004-46601 discusses that the image forming apparatus periodically connects to the information processing apparatus, and if the print data for the image forming apparatus is detected, the image forming apparatus acquires the print data to print it.

However, if an interval of connection from the image forming apparatus to the information processing apparatus is too short, load of the information processing apparatus or the network, which is a connection path, is increased. Further, if the connection interval is long, or if a state continues where the image forming apparatus cannot connect to the information processing apparatus for a long hours due to saving power or troubles, a great amount of print data is stored in the information processing apparatus to tighten a storage region. Furthermore, there is a problem in which when the image forming apparatus can be connected to the information processing apparatus after the image forming apparatus becomes connectable, the print data is delivered all at once, and thus it takes time until desired printing and outputting are performed from the image forming apparatus.

SUMMARY OF THE INVENTION

The present invention is directed to, when a file stored in a file server is printed, refusal of an unauthorized print request and speedy transmission of print data corresponding to a state of connection with an image forming apparatus, which is an output destination of print.

According to an aspect of the present invention, an image forming apparatus to access a file server and a job server connected to an internet via a local area network, and issue a print request of a file managed by the file server includes a file server connection unit configured to connect with the file server, a job server connection unit configured to connect with the job server, a token acquisition unit configured to acquire a token associated with connection with the image forming apparatus from the job server connected by the job server connection unit, a print request unit configured to issue the print request for the file server connected by the file server connection unit using the token acquired by the token acquisition unit, and a print unit configured to print print data received from the job server connected by the job server connection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of a list of management devices to be managed according to the exemplary embodiment.

FIGS. 3A and 3B are flowcharts illustrating examples of procedures of registration processing according to the exemplary embodiment.

FIG. 4 illustrates an example of a data format of processing request transmitted to a job server.

FIG. 5 is a flowchart illustrating an example of print processing.

DESCRIPTION OF THE EMBODIMENTS

Various exemplary embodiments, features, and aspects of the invention will be described in detail below with reference to the drawings.

Figure 1:
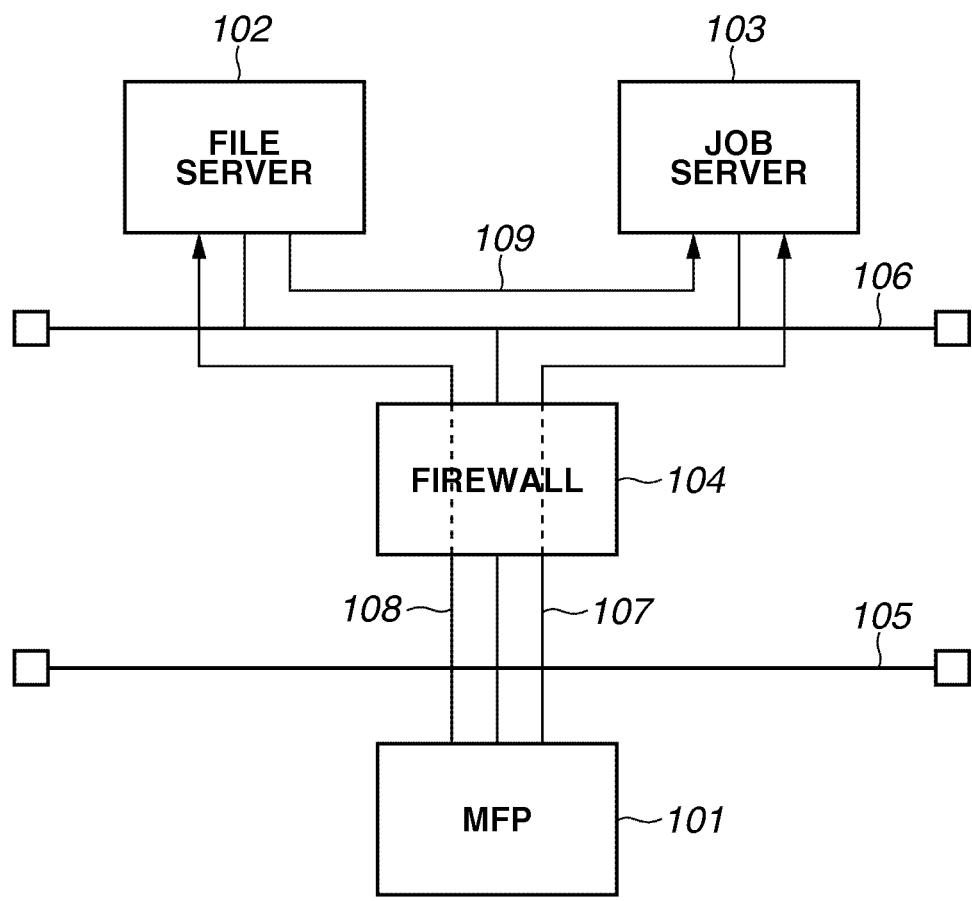
FIG. 1 illustrates an example of a network configuration according to an exemplary embodiment.

A first exemplary embodiment will be described. FIG. 1 illustrates an example of a network configuration including an information processing apparatus and an image forming apparatus. An image forming apparatus (multifunction peripheral (MFP)) 101 is connected to a local area network (LAN) 105, and can communicate with apparatuses connected to an internet 106 via a firewall 104.

The information processing apparatuses including a file server 102 and a job server 103 are connected to the internet 106. The firewall 104 allows connection from the LAN 105 to the internet 106, on the other hand, the connection from the internet 106 to the LAN 105 is refused to prevent the unauthorized access from the internet 106 to the LAN 105.

FIGS. 3A and 3B are flowcharts illustrating job server registration processing performed by the MFP 101 and image forming apparatus registration processing performed by the job server 103 in the network configuration illustrated in FIG. 1. The job server registration processing is performed when the MFP 101 uses the job server 103 for the first time.

In step S301, a control unit of the MFP 101 determines whether the job server is previously specified by a manager. When the job server is specified (YES in step S301), the processing proceeds to step S304. When the job server is not specified (NO in step S301), then in step S302, the job server is searched. In step S303, it is determined whether the job server is detected. When the job server is not detected (NO in step S303), the job server registration processing is ended. When the job server is detected (YES in step S303), then in step S304, the MFP registration request is transmitted to the job server.

FIG. 4 is an example of a data structure of a processing request transmitted from the image forming apparatus to the job server. FIG. 4 includes a request identification (ID) 401 indicating the MFP registration request, an image forming apparatus identification number 402, and image forming apparatus information 403.

In step S305, a response for the MFP registration request returned from the job server is determined. When a negative response is returned (NO in step S305), the job server registration processing is ended. When a positive response is returned (YES in step S305), then in step S306, the job server is registered as a connection destination into a non-volatile storage medium such as hard disk (HDD), and the job server registration processing is ended.

On the other hand, in step S311 illustrated in FIG. 3B, the control unit of the job server 103 determines whether the job server 103 that has received the MFP registration request from the MFP 101 in step S304 has received the MFP registration request. When the job server 103 has not received the MFP registration request (NO in step S311), the processing is ended. When the job server 103 has received the MFP registration request (YES in step S311), then in step S312, an MFP identification number is extracted from the MFP registration request. In step S313, it is determined whether the value is valid.

When it is determined that the value is invalid (NO in step S313), then in step S317, the negative response is transmitted to the MFP 101 and the MFP registration processing is ended. When it is determined that the value is valid (YES in step S313), then in step S314, MFP information 403 is extracted from the MFP registration request. In step S313, validity determination of the MFP identification number is performed to allow the only MFP that has been previously approved, for example, when the job server 103 is charged to use. In step S315, the MFP identification number and the image forming apparatus information are added to the list of the management devices as a new row as illustrated in FIG. 2. In step S316, the positive response is transmitted to the MFP 101, and the registration processing is ended.

According to the above-described processing, return of the positive response for the MFP registration request transmitted from the MFP 101 to the job server 103 indicates that the image forming apparatus is registered with the job server 103. Therefore, information about connection to the job server including an internet protocol (IP) address is recorded into the non-volatile storage medium such as the HDD, and since then, when connection information thereto is set, the image forming apparatus is allowed to be connected to the job server using the recorded information.

With reference to flowcharts illustrated in FIGS. 5 and 6, print control processing in the network configuration including the image forming apparatus and the information processing apparatus as illustrated in FIG. 1 will be described herebelow. FIG. 5 is the flowchart illustrating a procedure of print request processing performed by the MFP 101. A case will be described where an operator who desires to operate a file stored in the file server 102 from the MFP 101 operates an operation panel (not illustrated).

Upon an operation of the operation panel, the control unit of the MFP 101 performs file server connection (corresponding to 108 illustrated in FIG. 1) for connecting to the file server 102 using a hyper text transfer protocol (HTTP). Subsequently, the file stored in the file server 102 is operated. Upon an instruction from a web browser to specify and print a specific file, in step S501, job server connection (corresponding to 107 illustrated in FIG. 1) for connecting to the job server 103 set by the above-described job server registration processing is performed.

In step S502, a token (an identifier 201 associated with the connection to the image forming apparatus) acquisition request as illustrated with 404 and 405 in FIG. 4 is transmitted to the job server 103. In step S503, the token to be transmitted by the job server 103 is waited, and, when the token is received, then in step S504, the print request including the above-described token in which the job server 103 is specified as an output destination is issued to the file server 102. In step S505, the response from the file server 102 is waited.

In step S505, when the response is received (YES in step S505), then in step S506, the connection to the file server 102 is cut. In step S507, it is determined whether the response received in step S505 is the positive response. When the response is not the positive response (NO in step S507), in other words, when it is the negative response, the processing is ended. When it is the positive response (YES in step S507), then in step S508, it is determined whether the print job is received from the job server 103. Since the MFP 101 is connected with the job server 103 in step S501, by monitoring a connection port between the MFP 101 and the job server 103, transition of the print job from the job server 103 is detected. In step S508, when the print job is received (YES in step S508), then in step S509, the connection to the job server 103 is cut. In step S510, the print processing is performed on the received print job to print and output content of the specified file from the MFP 101.

The processing performed by the file server 102 will be described. The file server 102 transmits and receives the data in the format such as the HTML and an extensible markup language (XML) in HTTP processing performed between the file server 102 and the web browser operated in the image forming apparatus and the information processing apparatus such as a personal computer (PC). With this arrangement, operations including acquisition, writing, and deletion on the file stored in the file server 102 are performed.

For example, the file server 102 that has received the print request of the specific file from the web browser operated on the pc transmits the specific file specified as the response for the request. Thus, the web browser transfers the specific file to the image forming apparatus to perform printing and outputting. According to the present exemplary embodiment, the web browser is operated in the MFP 101, and the received specific file is desired to be printed and output from the MFP 101, however, the MFP 101 cannot always appropriately process the format of the specific file.

Therefore, in step S504 illustrated in FIG. 5, when the print request is issued for the file server 102, the job server 103 is specified as the output destination. With this specification, the file server 102 that has received the print request does not transmit the specified file to the MFP 101 as the response for the print request but the MFP 101 connects to the job server 103, which is the output destination specified by the print request (corresponding to 109 illustrated in FIG. 1). Together with the token attached to the print request, the print request including the specified file is transmitted. Subsequently, upon the reception of the response for the print request from the job server 103, the connection to the job server 103 is cut, and the response received from the job server 103 is transmitted corresponding to connection with the MFP 101.

Figure 6:
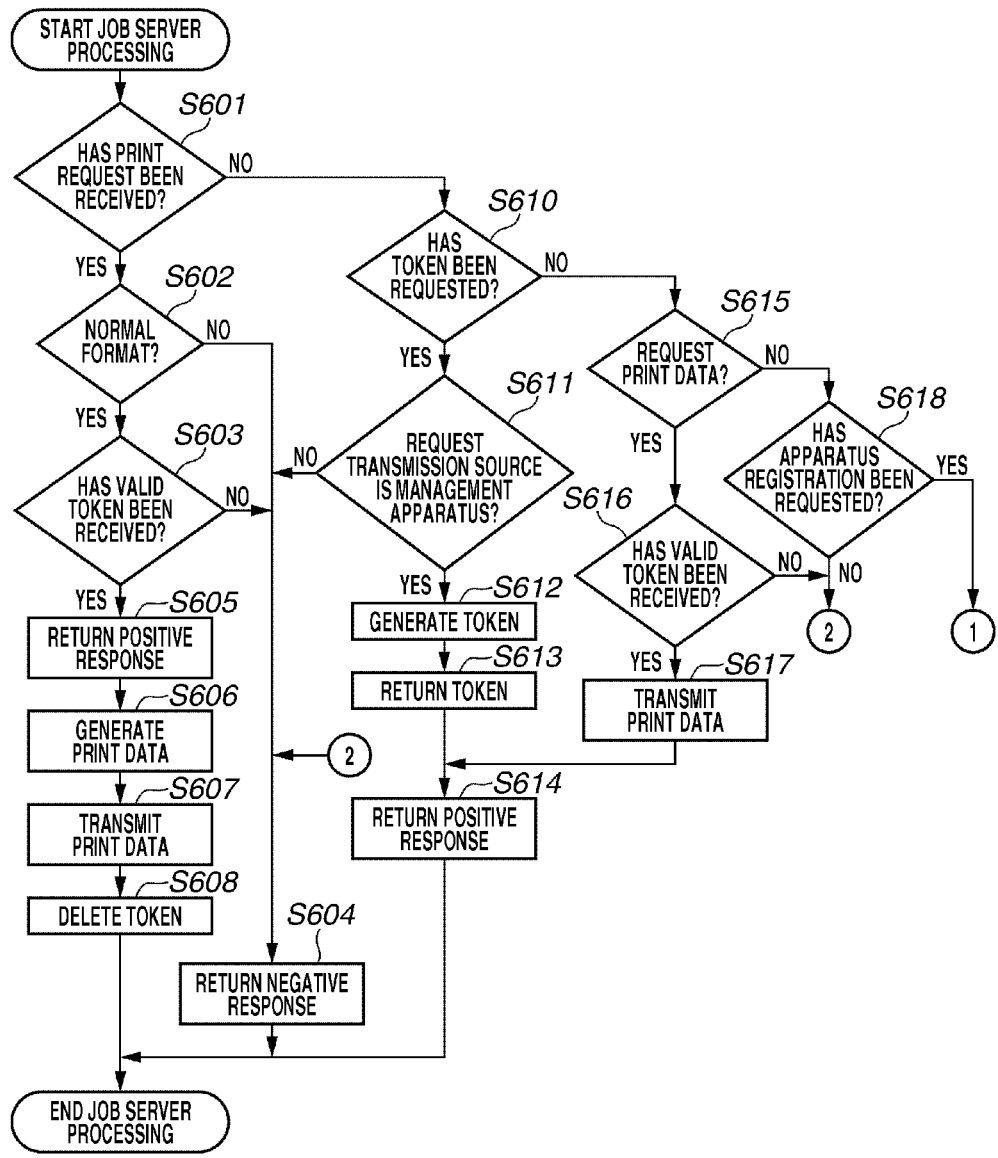
FIG. 6 is a flowchart illustrating an example of processing performed by a job server.

FIG. 6 is a flowchart illustrating a procedure of processing performed by the control unit of the job server 103. In S601, it is determined whether the received request is the print request. When it is the print request (YES in step S601), then in step S602, it is determined whether the format is normal. When it is not normal (NO in step S602), then in step S604, the negative response is returned to the print request source, and the processing is ended.

The print request includes a request ID 406, a token 407, and file data 408 to be printed as illustrated in FIG. 4. In step S602, the request format is normal (YES in step S602), then in step S603, it is determined whether the token received as a part of the print request is valid. When it is not valid (NO in step S603), then in step S604, the negative response is returned, and the processing is ended.

In step S603, when it is determined that the token is valid (YES in step S603), then in step S605, the positive response is returned to the print request source. In step S606, the format of the file received as the print request is converted into the format that can be processed by the image forming apparatus indicated with the token (selected with reference to a corresponding format 202 of a row indicated with the token in the management device list illustrated in FIG. 2) to generate the print data. In step S607, the print data is transmitted to the image forming apparatus via the connection port (corresponding to an item of a connection port 203 illustrated in FIG. 2) indicated with the token in the management device list illustrated in FIG. 2. In step S608, the token (corresponding to an item of a token 204 illustrated in FIG. 2), the item of the connection port 203, and an item of a waiting job 205 are deleted from the management device list illustrated in FIG. 2, and then the processing is ended.

On the other hand, in step S601, when the received request is not the print request (NO in step S601), then in step S610, it is determined whether the received request is the token acquisition request. When it is the token acquisition request (YES in step S610), then in step S611, the management device list illustrated in FIG. 2 is referred to. It is determined whether the request transmission source is the management device depending on whether the MFP identification number (corresponding to 405 illustrated in FIG. 4) included in the token acquisition request is listed in the management device list. When the request transmission source is not listed in the management device list (NO in step S611), the processing proceeds to step S604. When the request transmission source is listed in the management device list (YES in step S611), then in step S612, the token is generated. The generated token is recorded with the item of the token 204 in the management device list, and in step S613, the token is transmitted to the image forming apparatus that is the request source. Subsequently, in step S614, the positive response is transmitted and the processing is ended.

The MFP identification number for uniquely identifying the image forming apparatus that is the request source is combined with a port number, and the combined numbers may be encoded using a hash function such as secure hash algorithm (SHA) to be used as the token. In this case, a validity check of the token in step S603 described above is performed by searching the item of the token 204 in the management device list illustrated in FIG. 2, and then by depending on whether a row corresponding to the token is included.

In step S610, when the received request is not the token acquisition request (NO in step S610), then in step S615, it is determined whether the received request is the print data request. When it is not the print data request (NO in step S615), then in step S618, it is determined whether the received request is an apparatus registration request. When it is not the apparatus registration request (NO in step S618), then in step S604, the negative response is transmitted, and the processing is ended. When it is the apparatus registration request (YES in step S618), the processing from step S311 to step S317 illustrated in FIG. 3B described above is performed.

As described above, according to the present exemplary embodiment, when the file on the file server connected to the internet is printed, when it is difficult that the image forming apparatus appropriately outputs the specified file, the job server is previously connected. Subsequently, identification data referred to as a token associated with the connection with the image forming apparatus is received. The print request in which the job server is specified as the output destination is issued for the file server with the received token.

The file server that has received the print request is connected with the job server specified as the output destination, and then transmits the print request including the token and the specified file. The job server that has received the print request converts the specified file into the format that can be processed by the image forming apparatus indicated with the token to generate the print data. If the job server is connected to the image forming apparatus, the job server transmits the print data thereto. Subsequently, the image forming apparatus that has received the specified file outputs it onto a print medium to acquire more appropriate print output.

A second exemplary embodiment will be described. According to the first exemplary embodiment, if the MFP 101 is once connected with the job server 103 in step S501 illustrated in FIG. 5, a connection state is maintained after the print data is received until the connection is cut. However, after the token has been received in step S503, the connection with the job server 103 may be once cut, and after a predetermined time elapses, the MFP 101 may be connected with the job server 103 again at a regular interval, to acquire and print the print data.

In this case, after a predetermined time elapses, the MFP 101 is connected with the job server 103 and requests the print data with the token previously acquired, to perform the processing from step S508 to step S510 illustrated in FIG. 5.

On the other hand, the processing performed by the job server 103 determines whether the connection is continued with reference to the item of the connection port 203 in a row indicated with the token in the management device list illustrated in FIG. 2 after the print data has been generated in step S606 illustrated in FIG. 6. When the connection is not continued (corresponding to a case where the item of the connection port 203 is blank), the ID associated with a storage location of the generated print data is set for the item of the waiting job 205 in the management device list illustrated in FIG. 2, and the processing is ended.

Further, in step S615, it is determined whether the received request is the print data request. When it is the print data request (YES in step S615), then in step S616, it is determined whether the token included in the print data request is valid. When the token is invalid (NO in step S616), then in step S604, the negative response is transmitted, and the processing is ended. When the token is valid (YES in step S616), then in step S617, the print data (specified by the item of the waiting job 205) associated with the MFP indicated with the token is transmitted, and the processing is ended.

As described above, according to the present exemplary embodiment, it can be prevented that unnecessary connection is continued to disturb other connections. Further, when the MFP 101 is connected with the job server 103 again, a transmission request for invalid print data can be eliminated by transmitting the token previously received with the data request.

A third exemplary embodiment will be described. According to the second exemplary embodiment, since the print data is held in the job server 103 for a certain period, the print data can be illegally acquired by the unauthorized access via the internet. To address this problem, after the token is generated based on the request from the MFP 101 in step S612 illustrated in FIG. 6, the token is encrypted (hereafter, referred to as encrypted token) using a public key of the MFP 101, and in step S613, the encrypted token is returned to the MFP 101.

Since the encrypted token can be decrypted only with a secret key of the MFP 101, only the job server 103 generating the token and the MFP 101 owing the secret key can access the encrypted token. By using this system, after the print data has been generated in step S606 illustrated in FIG. 6 by the job server 103, the print data is encrypted (hereinafter, referred to as encrypted print data) using the token as the key.

If the connection is continued, the encrypted print data is transmitted instantly. If the connection is cut, the encrypted print data is transmitted when the MFP 101 is connected. The MFP 101 that has received the encrypted print data decrypts the encrypted token with its own secret key previously acquired to extract the token. Since the encrypted print data is encrypted using the token as the key, the encrypted print data is decrypted using the token to acquire the print data. The public key of the MFP 101 may be acquired with MFP characteristics information in step S314 by the MFP registration processing as illustrated in FIGS. 3A and 3B.

As described above, according to the present exemplary embodiment, the print data is encrypted using the token. The token itself is encrypted with the public key of the image forming apparatus, which is the request source, for its use, thereby preventing content from being revealed even when the print data is illegally acquired.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable storage medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-129533 filed Jun. 9, 2011, which is hereby incorporated by reference herein in its entirety.

What is claimed is:

1. A printing system comprising:
a printing apparatus;
a file server which stores a file; and
a job server,
wherein the printing apparatus includes
a token acquisition unit configured to acquire a token for indicating the printing apparatus and a connection port of the printing apparatus from the job server, and
a print request transmitting unit configured to transmit, to the file server, a print request for the file stored by the file server and the token acquired by the token acquisition unit,
wherein the file server includes
a print request receiving unit configured to receive, from the printing apparatus, the print request and the token which are transmitted by the print request transmitting unit, and
a file transmitting unit configured to transmit, to the job server, the file corresponding to the print request which is received by the print request receiving unit and the token which is received by the print request receiving unit, wherein the job server includes
a file receiving unit configured to receive, from the file server, the file and the token which are transmitted by the file transmitting unit,
a determining unit configured to determine whether the token is valid,
a converting unit configured to convert the file to print data which is able to be processed by the printing apparatus, and
a print data transmitting unit configured to transmit, to the printing apparatus, the print data converted by the converting unit in a case where the determining unit determines that the token is valid,
wherein the printing apparatus further includes
a print data receiving unit configured to receive, from the job server, the print data via the connection port indicated by the token, and
a print unit configured to perform printing based on the print data received by the print data receiving unit.

2. The printing system according to claim 1, wherein the printing apparatus is configured to maintain a state of connection with the job server until the print data receiving unit receives the print data.

3. The printing system according to claim 1, wherein the print request specifies the job server as an output destination.

4. A control method for a printing system comprising a printing apparatus, a file server which stores a file, and, a job server, the control method comprising:

acquiring, by the printing apparatus, a token for indicating the printing apparatus and a connection port of the printing apparatus from the job server;
transmitting, to the file server from the printing apparatus, a print request for the file stored by the file server and the acquired token;
receiving, from the printing apparatus by the file server, the print request and the token which are transmitted;
transmitting, to the job server from the file server, the file corresponding to the print request which is received by the print request receiving unit and the token which is received by the print request receiving unit;
receiving, from the file server by the job server, the file and the token which are transmitted;
determining, by the job server, whether the token is valid;
converting, by the job server, the file to print data which is able to be processed by the printing apparatus;
transmitting, to the printing apparatus from the job server, the converted print data in a case where it is determined that the token is valid;
receiving, from the job server by the printing apparatus, the print data via the connection port indicated by the token; and
performing printing, by the printing apparatus, based on the print data received by the printing apparatus.

* * * * *